(12) United States Patent
Karem

(10) Patent No.: US 8,083,172 B2
(45) Date of Patent: Dec. 27, 2011

(54) COMBINATION SPAR AND TRUNNION STRUCTURE FOR A TILT ROTOR AIRCRAFT

(76) Inventor: Abe Karem, N. Tustin, CA (US)

( * ) Notice: Subject to any disclaimer, the term of this patent is extended or adjusted under 35 U.S.C. 154(b) by 301 days.

(21) Appl. No.: 12/429,404

(22) Filed: Apr. 24, 2009

(65) Prior Publication Data

US 2009/0266941 A1 Oct. 29, 2009

Related U.S. Application Data

(60) Provisional application No. 61/047,853, filed on Apr. 25, 2008.

(51) Int. Cl.
*B64C 27/22* (2006.01)
*B64C 39/00* (2006.01)
(52) U.S. Cl. ........................................ 244/7 C
(58) Field of Classification Search .............. 244/7 A, 244/7 C, 7 R, 12.4, 56
See application file for complete search history.

(56) References Cited

U.S. PATENT DOCUMENTS

| | | | | |
|---|---|---|---|---|
| 3,797,783 A | * | 3/1974 | Kisovec | 244/7 A |
| 4,323,332 A | * | 4/1982 | Fradenburgh | 416/134 A |
| 5,096,140 A | * | 3/1992 | Dornier et al. | 244/7 C |
| 6,607,161 B1 | * | 8/2003 | Krysinski et al. | 244/7 A |
| 6,641,365 B2 | | 11/2003 | Karem | |
| 2007/0158494 A1 | * | 7/2007 | Burrage | 244/7 R |

* cited by examiner

*Primary Examiner* — Joshua J Michener
*Assistant Examiner* — Valentina Xavier
(74) *Attorney, Agent, or Firm* — Fish & Associates, PC

(57) ABSTRACT

An aircraft is equipped with a spinnion coupling an inboard wing to a tilting nacelle. The spinnion is advantageously configured to extend across the nacelle from an inboard junction to an outboard junction, and terminates inside the inboard wing. This provides an efficient lightweight structure to support a nacelle and facilitate tilting of the nacelle. The spinnion, which can be configured to be at least partially disposed within the inboard wing, is advantageously concentric with the tilting axis in order to facilitate tilting of a nacelle. A cross-wing driveshaft can be included, disposed at least partly within the inboard wing, and can advantageously be configured to terminate inside the spinnion at a junction with a miter gearbox. The miter gearbox can be disposed at least partly within the spinnion but more preferably lies entirely within the spinnion, and functions to transfer power from an input shaft to the cross-wing driveshaft.

11 Claims, 4 Drawing Sheets

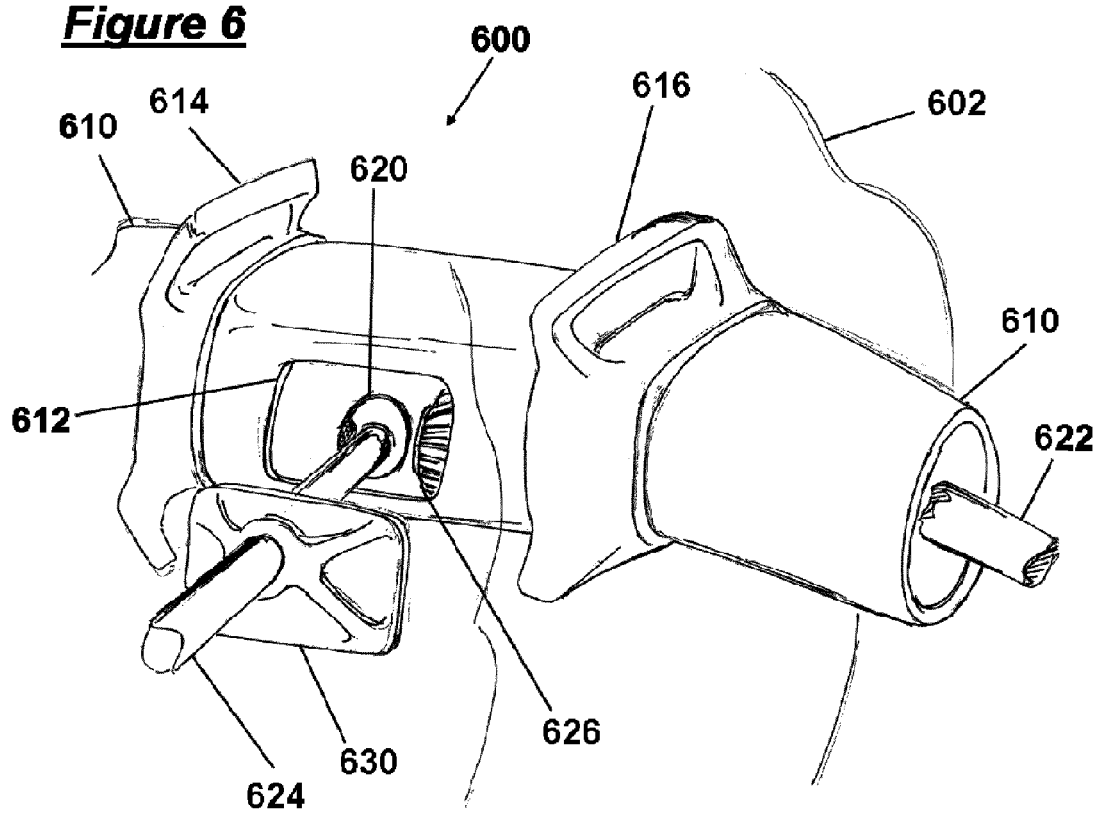

COMBINATION SPAR AND TRUNNION STRUCTURE FOR A TILT ROTOR AIRCRAFT

This application claims priority to U.S. Provisional Application Ser. No. 61/047,853 filed Apr. 25, 2008 which is incorporated by reference herein in its entirety.

FIELD OF THE INVENTION

The field of the invention is rotorcraft.

BACKGROUND

Tiltrotor aircraft are known in the prior art, including the Bell™ XV-3, XV-15, V-22, and BA609. Tiltrotor and tiltwing aircraft convert between a forward flight cruise mode and a hover mode by changing the orientation of their propellers or rotors and nacelles. Tilting of the nacelle or wing typically occurs about a pivot point commonly called the conversion spindle. The spindle is usually a circular pivot attached to the rotating structure (i.e. wing or nacelle) and inserted into the non-rotating fuselage or wing of the aircraft. For increased redundancy and reliability, the engine driving a rotor on one side of the aircraft is usually configured to have the capability of driving the rotor on the other side of the aircraft by linking the two propulsion systems with what is commonly termed a cross-wing driveshaft. This shaft runs from one propulsion and gearbox system across the wing and into another rotor gearbox and propulsion system. As this driveshaft leaves the wing and enters the nacelle and gearbox of a tilting nacelle it passes through the center of the tilting pivot so that it is not interrupted by the tilting motion. As used herein, a component that rotates can complete an entire revolution about an axis, while a component that tilts can only rotate through a portion of a complete revolution.

FIG. 1 shows a typical prior art tiltrotor aircraft 100 comprising a wing 102 and fuselage 104 with a first tilting rotor system 110 comprising a first rotor blade 112 and first nacelle 118 in aircraft cruise mode corresponding with a generally horizontal position of the nacelle 118. The aircraft is also equipped with a second tilting rotor system 120 on the opposite end of the wing 102. The second rotor system 120 is depicted in conversion from a horizontal position consistent with aircraft cruise mode to a vertical position consistent with helicopter mode. In practice, nacelles 118, 128 on either side of the aircraft in prior art tiltrotors have a substantially identical tilt angle. The tilt angle 136 of a nacelle 128 is the angle 136 between the tilting nacelle axis 138 and the aircraft axis 134. In a typical tilt rotor aircraft 100, the nacelle 104 is also capable of operation in a generally vertical position used in helicopter mode flight. The nacelle 128 tilt angle 136 is usually affected using a tilt actuator and mechanism to convert from helicopter mode flight to aircraft cruise mode. A cross-shaft 106 is disposed within the wing 102 and runs between left and right nacelles 118, 128.

The article "Fail safety aspects of the V-22 pylon conversion actuator" by Duane Hicks published in 1992 summarizes the state of prior art tiltrotor conversion mechanisms. Prior art FIG. 2 is a top view schematic of the Bell™ V-22 tilting system 200 including conversion mechanism, nacelle 218, and wing 202. An engine and gearbox 238 drive a rotor hub 230 coupled to a mast 236 by means of a gimbal 232. A pitchable blade 234 is coupled to the hub 230.

The nacelle 218 and rotor hub 230 pivot as a system about the conversion axis 256. The conversion spindle 250 is aligned and centered on the conversion axis 256. The conversion spindle 250 is supported at two locations, a first inboard bearing 252 carried by the wing 202 and a second outboard bearing 254 also carried by the wing, in order to cantilever the nacelle from the wing. An actuator 240 connected to an actuator spindle 242 aligned with an actuator spindle axis 244 provides motive force to tilt to tilt the nacelle 218 and rotor about the conversion axis 256. The input to the cross-wing driveshaft 260 enters a miter gearbox 262 that converts motion on the miter gearbox axis 264 to the conversion axis 256. The tilting split line 208 is shown as a dashed line.

In the V-22 and other known tiltrotors, the conversion spindle 250 acts as a tunnel between the wing 202 and nacelle 218, through which the cross-wing driveshaft 266 passes. In prior art configurations, the conversion spindle 250 is attached to the nacelle 218 through nacelle structure and a support 254 on the inboard side wall (where inboard is defined as the fuselage side at a parting plane at the rotor rotation axis). This leaves the cross-wing shaft 266 exposed inside the nacelle but outside of the conversion spindle 250. This configuration cantilevers the nacelle 218 on the spindle 250, transferring any bending in the spindle 250 into the nacelle frame at the inboard support 254. A bending load in the spindle 250 can be produced in either forward flight mode or helicopter mode. In forward flight mode, the torque reaction to the rotor and rotor hub 230 induces a bending load on the conversion spindle 250. Lift and drag forces on the nacelle 218 also contribute to this load. In hover, bending is induced in the conversion spindle 250 through the vertical lift generated by the rotor and rotor hub 230 and any lateral thrust vectoring of the rotor thrust.

Prior art tiltrotor aircraft mentioned herein operate with what is termed "gimbaled" or "hinged" rotor systems. That is, their rotors are allowed to tilt about an axis at the hub to nacelle or blade to hub interface, but their masts remain stationary with respect to the non-rotating structure. This hinging means that although the rotors transmit a substantial thrust load, they transmit only small moments from the rotor to the aircraft structure.

A tiltrotor with a hingeless rotor would be able to produce large rotor moments that create operational advantages over traditional tiltrotors. These large moments could easily exceed the moment capability of a traditional conversion spindle. For example, a stiff hingeless rotor such as an Optimum Speed Tilt Rotor (OSTR) as described in U.S. Pat. No. 6,641,365 would provide the increased rotor moment capability of the hingeless rotor and the increased torque output of a large and lightweight rotor. Additionally, it is now appreciated that a wing section outboard of the nacelle (see Tilt Outboard Wing For Tilt Rotor Aircraft, U.S. patent application Ser. No. 11/505,025) can increase the aircraft cruise efficiency but will substantially increase the bending loads through the spindle. These combined loads dramatically increase the applied bending transmitted to the conversion spindle both in hover and airplane flight modes.

The '365 patent and the '025 application, and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

In airborne vehicles, weight is usually critical to the viability of the vehicle. Thus, in designing the attachment structure between the nacelle and wing, designers of the prior art have typically opted for the lowest loading configuration. To this end, the concept of outboard wings on tilt rotor aircraft has been largely ignored due to the high bending moments that applied to the conversion spindle. Conversion spindles in the prior art are short, ending at the first inboard wall of the nacelle and not continuing through to a second interface. In a lightly loaded case, the increased cantilevered load that this configuration transmits to the nacelle is minimal. The implementation of a hingeless rotor vehicle configuration presents benefits and challenges in this area.

Thus, there is still a need for a system that provides (a) a conversion spindle capable of high moment loading in a tiltrotor aircraft, and (b) an integral structural support for an outboard wing, while minimizing weight of the support.

SUMMARY OF THE INVENTION

The present invention provides apparatus, systems and methods in which an aircraft is equipped with a spinnion coupling an inboard wing to a tilting nacelle. The spinnion is advantageously configured to extend across the nacelle from an inboard junction to an outboard junction, and terminates inside the inboard wing. This provides an efficient lightweight structure to support a nacelle and facilitate tilting of the nacelle.

The tilting of the nacelle relative to the inboard wing defines a tilting axis. The spinnion, which can be configured to be at least partially disposed within the inboard wing, is advantageously concentric with the tilting axis in order to facilitate tilting of a nacelle. In applications where an aircraft has more than one nacelle, a cross-wing driveshaft may transfer power from one nacelle to another. The cross-wing driveshaft can be disposed at least partly within the inboard wing, and can advantageously be configured to terminate inside the spinnion at a junction with a miter gearbox. The miter gearbox can be disposed at least partly within the spinnion but more preferably lies entirely within the spinnion, and functions to transfer power from an input shaft to the cross-wing driveshaft.

A rotorcraft such as a tiltrotor can be equipped with a hingeless rotor carried by a nacelle, the rotor having a rotation axis, wherein the tilting axis may or may not be orthogonal to the rotor rotation axis. In more preferred aircraft, an outboard wing can advantageously be coupled to the nacelle by means of the spinnion. In especially preferred embodiments, the spinnion can serve as the primary structural support for the outboard wing, and can extend from the inboard wing through the nacelle to the outboard wing. When the spinnion serves as a support for the outboard wing, the spinnion can be constructed with a kink so that it is be entirely linear; this allows it to pass through the thickest portion of the outboard wing.

Viewed from another perspective, an aircraft having an inboard wing and a rotor carried by a tilting nacelle is subject to loads produced by both the rotor and the nacelle. Such an aircraft can advantageously be configured with a spinnion that extends from the inboard wing, across an inboard load-carrying junction of the nacelle to an outboard load-carrying junction of the nacelle, such that a subset of the loads is introduced into the spinnion at the inboard junction.

In more preferred embodiments, a second portion of the loads can be introduced into the spinnion at the outboard junction. In especially preferred embodiments, the aircraft can be configured with an outboard wing that is cantilevered off the nacelle, and wherein the spinnion provides a primary structural support for the outboard wing. The outboard wing can advantageously be configured to tilt with the tilting nacelle.

BRIEF DESCRIPTION OF THE DRAWING

FIG. 6 is an illustration showing the details of an interface between a spinnion and a miter gearbox.

DETAILED DESCRIPTION

The present invention provides apparatus, systems and methods in which a conversion spindle disposed at least partially within an inboard wing extends across a nacelle to an outboard junction. As used herein, the resulting integrated structure is termed a "spinnion".

Figure 1:
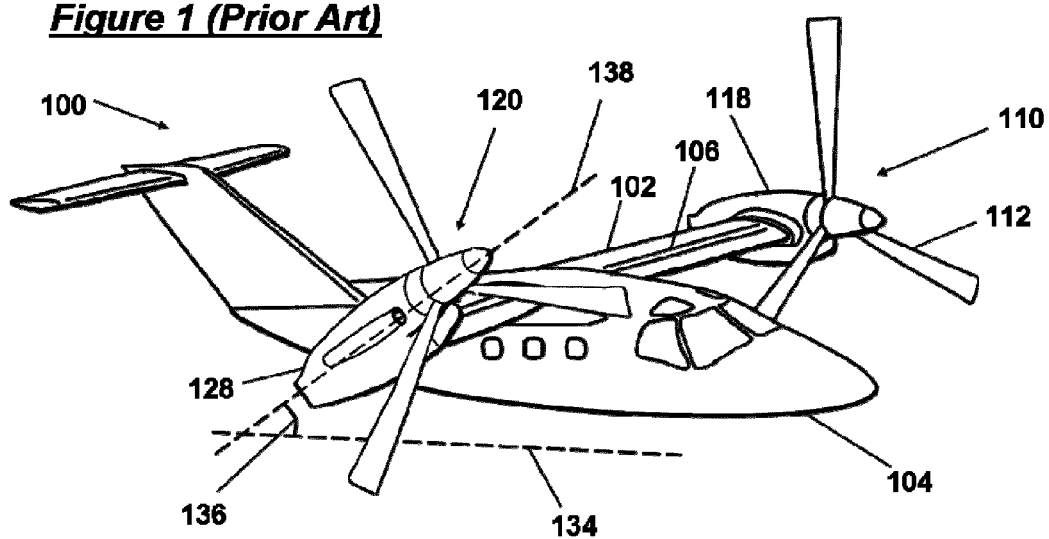
FIG. 1 shows a typical prior art tiltrotor aircraft.
Figure 2:
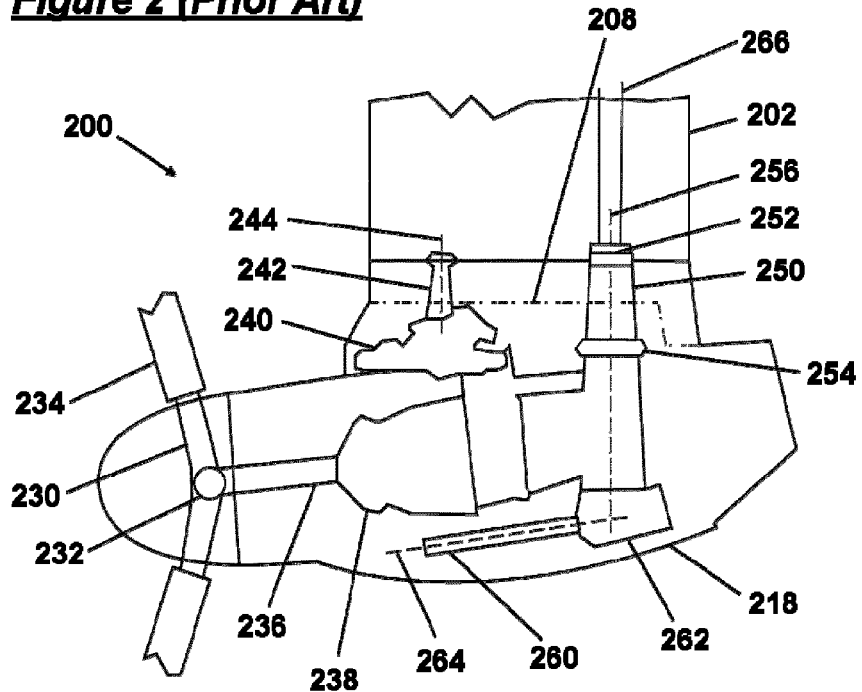
FIG. 2 is a top view schematic of a prior art tilting system.
Figure 3:
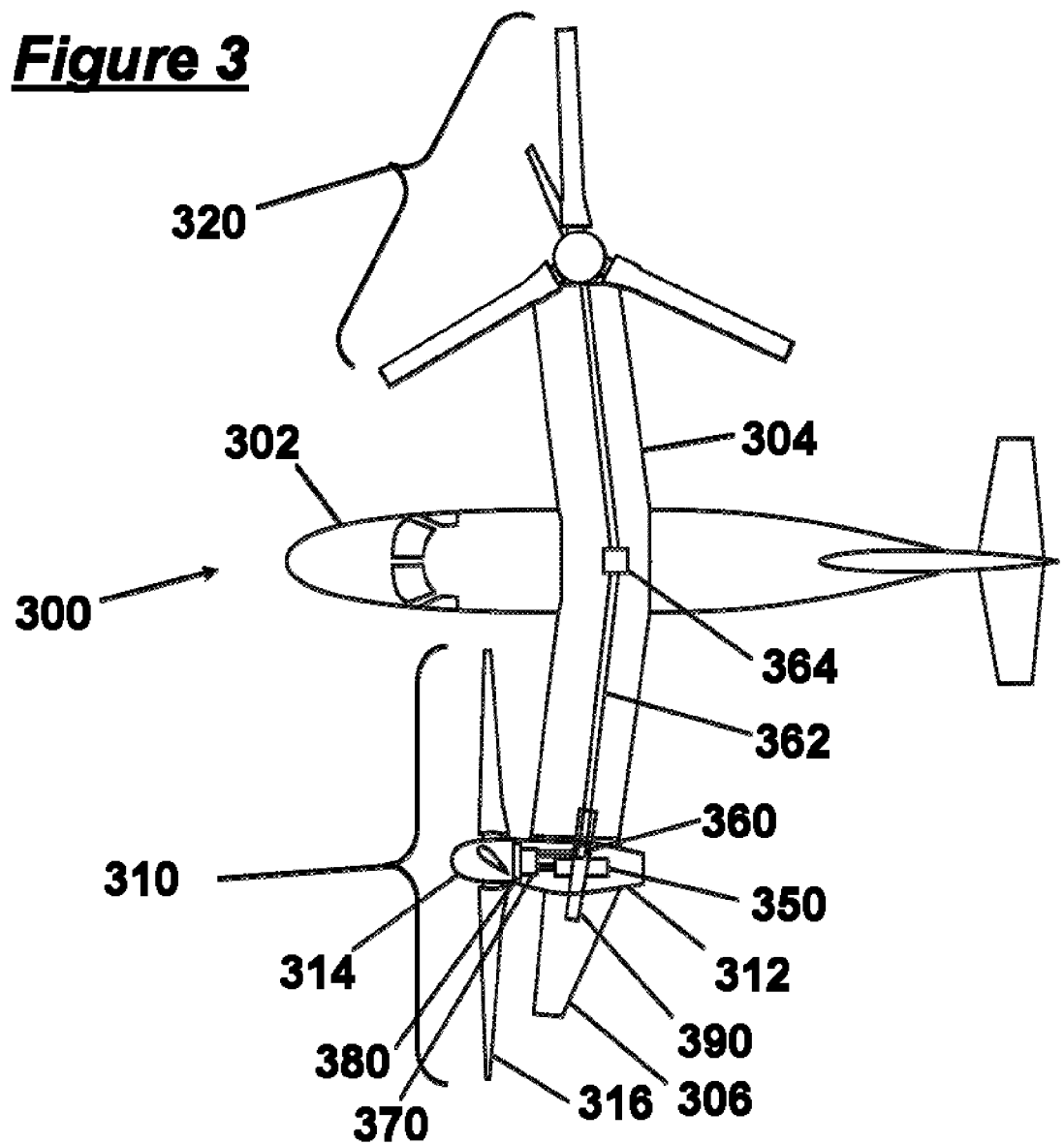
FIG. 3 is a schematic top view illustration of a preferred tiltrotor aircraft.

FIG. 3 is a schematic top view illustration of a preferred tiltrotor aircraft 300. The aircraft comprises a fuselage 302, inboard wing 304, first rotor system 310, and second rotor system 320. The second rotor system 320 is shown in a vertical orientation, consistent with helicopter-mode flight. The first rotor system 310 is shown in a horizontal orientation, consistent with airplane-mode cruise flight. In practice, the first rotor system 310 and second rotor system 320 are likely to have a substantially similar orientation at any given time in flight. An outboard wing 306 tilts with the nacelle 312.

A first rotor system 310 comprises a hub 314 coupled to a tilting nacelle 312, which tilts with respect to the wing 304. A rotor blade 316 is coupled to the rotor hub 314. An engine 350 is preferably disposed within the tilting nacelle 312 and is coupled to a shifting gearbox 370. The shifting gearbox is coupled to a numerical reduction ratio reduction gearbox 380. The reduction gearbox 380 is coupled to and drives the rotor hub 314. A miter gearbox 360 is also coupled to the shifting gearbox 370 as well as a cross-wing driveshaft 362. The cross-wing driveshaft 362 is preferably disposed within the wing 304 and distal ends of the cross-wing driveshaft 362 are preferably coupled by a mid-wing gearbox 364. The cross-wing driveshaft 362 serves to transmit power from an engine 350 in a tilting nacelle 312 to a second rotor system 320 on the opposite side of the aircraft 300.

In preferred configurations, the miter gearbox 360 is disposed within a spinnion 390, which also serves as a spar and support for both the outboard wing 306 and tilting nacelle 312. The cross-wing driveshaft 362 terminates inside the spinnion 390 at an interface with the miter gearbox 360.

Figure 4:
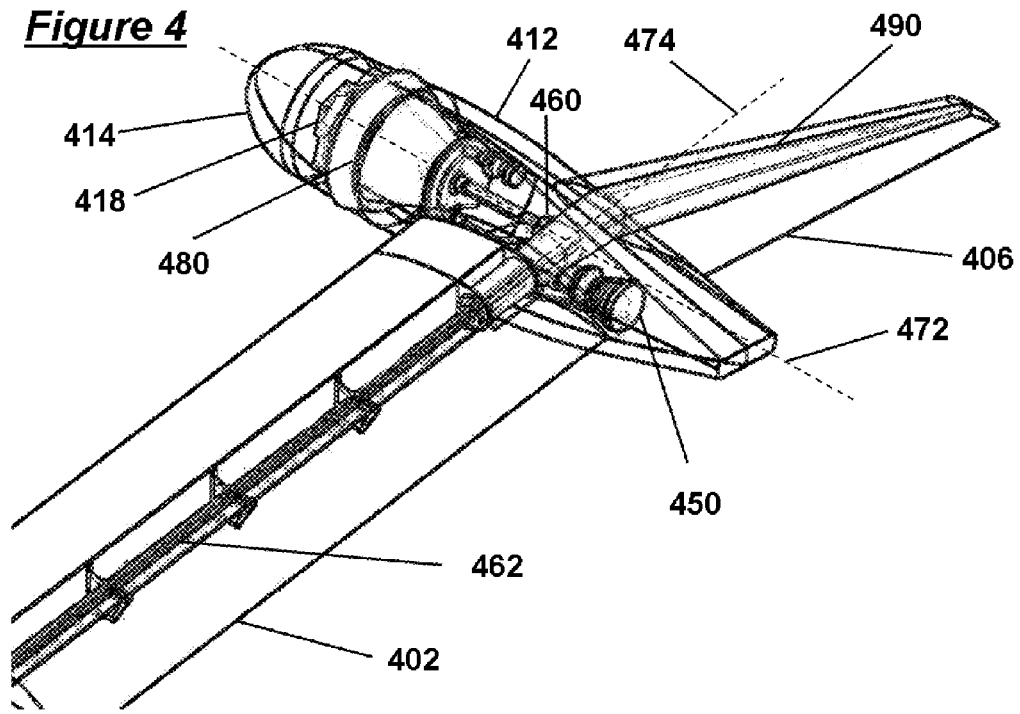
FIG. 4 is a perspective illustration of a portion of a preferred tiltrotor aircraft including a spinnion.

FIG. 4 is a perspective illustration of a portion of a preferred tiltrotor aircraft that comprises an inboard wing 402 (inboard of the rotor rotation axis 472) that carries a tilting nacelle 412 that defines a tilting axis 474 relative to the inboard wing 402. A spinnion 490 is at least partially disposed within the inboard wing 402, and a cross-shaft 462 having a gearbox 460 is at least partially disposed within the spinnion 490. The aircraft has a tilting axis 474 that can be orthogonal to the rotor rotation axis 472.

In more preferred embodiments, the gearbox 460 is completely disposed within the spinnion, the aircraft further comprises an outboard wing 406, and the spinnion 490 extends into the outboard wing 406. In that manner a first portion of the loads is introduced into the spinnion 490 at an inboard junction, and a second portion of the loads are introduced into the spinnion at an outboard junction. It can further be seen that the inboard junction is on the inboard side of the rotor rotation axis while the outboard junction is on the outboard side of the rotor rotation axis.

The specific angle between the tilting axis and the rotor rotation axis is regarded as a design choice. Accordingly, FIG.

4 should be interpreted generically as including both alternatives (a) where the tilting axis is orthogonal to the rotor rotation axis and (b) where the tilting axis is not orthogonal to the rotor rotation axis.

Figure 5:
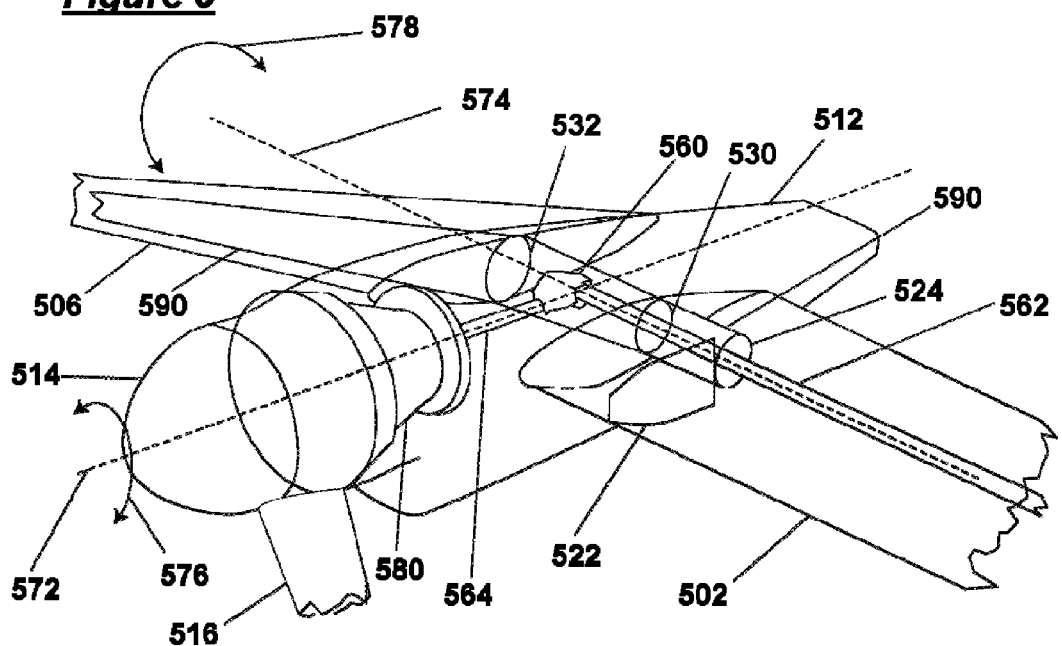
FIG. 5 is perspective illustration of an alternate preferred spinnion and aircraft structure.

FIG. 5 is another perspective illustration of an alternate preferred spinnion and aircraft structure. An inboard wing 502 is coupled to a tilting nacelle 512 and an outboard wing 506 that tilts with the nacelle 512. The nacelle 512 carries a rotor comprising a spinner 514 and rotor blade 516. The rotor rotates about a rotor rotation axis 572 in the manner indicated by arrow 576. The rotor and nacelle 512 tilts about a tilting axis 574 relative to the inboard wing 502. In some preferred embodiments, and as shown in FIG. 5, the tilting axis 574 is orthogonal to the rotor rotational axis 572. In other embodiments (as in FIG. 3), the tilting axis might not be orthogonal to the rotor rotational axis.

A spinnion 590 runs between the inboard wing 502 and extends into the outboard wing 506 through the nacelle 512. The spinnion is at least partly disposed within the inboard wing. A miter gearbox 560 is at least partially and more preferably completely disposed within the spinnion 590. In some preferred embodiments, and as shown in FIG. 5, the spinnion 590 is not entirely linear from the inboard wing 502 to the outboard wing 506, and may have a kink or bend in it.

From examination of FIG. 5, it may be seen that the spinnion 590 extends across the nacelle 512. The nacelle 512 has an inboard load-carrying junction 530 with the spinnion 590, which may comprise a bearing. The nacelle also has an outboard load-carrying junction 532 with the spinnion 590. The spinnion 590 can advantageously have a cutout to allow a cross-wing input shaft 564 to interface with a miter gearbox 560 disposed within the spinnion 590, the miter gearbox 560 also interfacing with a cross-wing driveshaft. Some embodiments may have a support bearing 524 inboard of the inboard load-carrying junction 530 which can also carry some loads. The support bearing 524 can be carried by a wing rib 522.

Both the rotor, comprising a rotor blade 516, and the outboard wing 506 produce loads. It is contemplated that for a tiltrotor aircraft with a hingeless rotor, the rotor might produce mast moments of 100000, 300000, or even 600000 foot-pounds that can be transferred to the nacelle 512 and spinnion. Likewise, the outboard wing 506 might produce lift of 5000, 10000, or even 15000 pounds which are transferred to the spinnion. One skilled in the art will appreciate that a first subset of the total loads carried by the spinnion 590 is introduced at the inboard junction 530, while a second subset of the total loads is introduced at the outboard junction 532.

Unless a contrary intent is apparent from the context, all ranges recited herein are inclusive of their endpoints, and open-ended ranges should be interpreted to include only commercially practical values. Similarly, all lists of values should be considered as inclusive of intermediate values unless the context indicates the contrary.

The outboard wing 506 is seen to be cantilevered off the nacelle 512, and the primary support spar of the outboard wing 506 can advantageously be configured to be the spinnion 590. In preferred embodiments, the outboard wing structural spar which is the spinnion 590 runs through the thickest portion of the outboard wing 506, which is intended to maximize the effectiveness of the spar material. Those skilled in the art will appreciate that the spinnion need not be entirely linear from the inboard wing to the outboard wing.

Those skilled in the art will also appreciate that there is a discontinuity between the position of the cross-wing driveshaft and the desired position of the outboard wing spar. In order to integrate the conversion spindle with the outboard wing spar structure, the outboard wing is staggered slightly behind the inboard wing, allowing the two structures to coincide, and thus be integrated into a spinnion.

In preferred embodiments, the spinnion extends not only from the inboard wing, and across to a cantilevered outboard load-carrying junction of the nacelle, but also into an outboard wing. In the outboard wing, the spinnion acts as a primary structural support.

FIG. 6 is an illustration showing the details of an interface 600 between a spinnion 610 and a miter gearbox 620. Because the spinnion continues across the nacelle 602, the miter gearbox 620 can be advantageously encased within the spinnion 610. In such a configuration, the shaft exit of the gearbox interrupts the spinnion structure. The miter gearbox 620 must convert motion and input torque from a miter gearbox input shaft 624 to a cross-wing driveshaft 622. Such conversion can require an angle change of 70, 80, 90, 110, or even 110°, and can advantageously be achieved using a bevel gear 626.

In preferred embodiments, the spinnion 610 is constructed of carbon composite. An interface for the cross-wing driveshaft 622 and the miter gearbox input shaft 624 is accommodated by creating a cutout 612 in the spinnion 610. In especially preferred embodiments, this interface occurs on the side web of the spinnion structure, leaving the high strength composite caps at the top and bottom of the spinnion 610 intact. The web laminate (which consists primarily of biased plies) is cut out, and a titanium bolted fitting and bulkhead 630 are installed. The resulting titanium bulkhead 630 acts as both the mounting face for the miter gearbox 620 and the shear carrying web of the spinnion 610 in the area of the cutout 612. The titanium fittings attaching the nacelle to the spinnion are also shown.

The nacelle 602 is also equipped with an inboard load-carrying junction 616 with the spinnion 610 as well as an outboard load-carrying junction 614. The total loads carried by the spinnion 610 are transferred through these junctions 614, 616. In some preferred embodiments, these junctions 614, 616 may be constructed of a different material than the spinnion. For example, the junctions can be constructed of titanium and the spinnion can be of carbon composite construction.

Methods are also contemplated herein for using moment loads to directionally control an aircraft having a hingeless rotor supported by a nacelle. Preferred methods comprise providing a spinnion that extends between an inboard wing and the nacelle, and using the spinnion to transfer moment loads produced by the rotor to the inboard wing. Especially preferred methods comprise extending the spinnion to an outboard junction of the nacelle, providing an outboard wing that tilts with the nacelle, and extending the spinnion into the outboard wing. In such methods the spinnion would be used to transfer moment loads produced by the outboard wing to the inboard wing.

Thus, specific embodiments and applications of a tilt conversion spindle and integral spar have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An aircraft comprising:
   an inboard wing that carries a tilting rotor in a manner that defines a tilting axis relative to the inboard wing;
   a nacelle that tilts with the rotor;
   a spinnion at least partially disposed within the inboard wing and that extends across the nacelle to an outboard junction; and
   a cross-shaft having a gearbox that is completely disposed within the spinnion.

2. The aircraft of claim 1, further comprising a rotor having a rotation axis, wherein the tilting axis is orthogonal to the rotor rotation axis.

3. The aircraft of claim 2, wherein the tilting axis is not orthogonal to the rotor rotation axis.

4. The aircraft of claim 1, further comprising an outboard wing, and the spinnion extends into the outboard wing.

5. The aircraft of claim 4, wherein the spinnion is not entirely linear from the inboard wing to the outboard wing.

6. The aircraft of claim 1, further comprising a nacelle that carries the rotor, and the spinnion extends across the nacelle.

7. An aircraft comprising:
   a rotor carried by a tilting nacelle, the nacelle carried by an inboard wing, wherein each of the rotor and nacelle produce loads; and
   a spinnion that extends from the inboard wing, across an inboard load-carrying junction of the nacelle to an outboard load-carrying junction of the nacelle, such that only a portion of the loads is introduced into the spinnion at the inboard junction; and
   an outboard wing that is cantilevered off the nacelle, and wherein the spinnion provides a primary structural support for the outboard wing;
   a gearbox completely disposed within the spinnion; and
   the spinnion being not entirely linear from the inboard wing to the outboard wing.

8. The aircraft of claim 7, wherein another portion of the loads are introduced into the spinnion at the outboard junction.

9. The aircraft of claim 7, wherein the rotor is a hingeless rotor.

10. The aircraft of claim 9, wherein the rotor produces a mast moment of at least 100,000 foot-pounds.

11. The aircraft of claim 10, wherein the outboard wing rotates with the nacelle.

* * * * *